United States Patent [19]

Petrella

[11] 3,882,067

[45] May 6, 1975

[54] FLOOR POLISH

[75] Inventor: Robert G. Petrella, Glenolden, Pa.

[73] Assignee: Air Products and Chemicals, Inc., Allentown, Pa.

[22] Filed: May 17, 1971

[21] Appl. No.: 144,254

[52] U.S. Cl............ 260/28.5 R; 106/10; 260/78.5; 260/79.3 M; 260/86.1; 260/924; 260/925; 260/955
[51] Int. Cl. ......................................... C08f 45/52
[58] Field of Search................. 260/28.5 R; 106/10

*Primary Examiner*—Joseph L. Schofer
*Assistant Examiner*—P. R. Michl
*Attorney, Agent, or Firm*—Barry Moyerman

[57] ABSTRACT

Floor polishes are improved by incorporating therein a fluorochemical which is either an amine salt of a fluorinated cyclic carbinol which has been reacted with phosphorus pentoxide or an amine salt of undecafluorocyclohexane carbinol acrylate-methacrylic acid copolymer.

12 Claims, No Drawings

3,882,067

FLOOR POLISH

BACKGROUND OF THE INVENTION

The present invention relates to polish compositions and, more particularly, to floor polishes containing fluorochemicals which are useful on linoleum, vinyl, rubber and asphalt floor tile.

In recent years certain fluorochemicals, such as the potassium salt of perfluorooctanoic acid, have been incorporated into polish compositions in order to improve the flow and leveling characteristics of floor polishes used to coat floor tiles. When floor polishes are applied to a floor without a fluorochemical, the floor polishes often do not flow out to form a level coating. As a result the coated surface appears to be imperfect with variations in the surface gloss of the treated floor tiles. The fluorochemicals which have been used to correct the flow and leveling problems are highly surface active and can cause the formation of bubbles in the applied floor polish. As a result film imperfections occur which mar the appearance and utility of the coated floor tiles.

Typically, polish compositions for use on floors are judged on the basis of their performance as measured by gloss, black heel marking, rubber heel marking, slip, leveling, etc. Although the general appearance of a polish film is influenced by many factors, the appearance of the polish film is most sensitive, particularly for polishes on light colored tiles, to dirt pick-up and heel marking. Dirt pick-up occurs when dirt particles are embedded in a polish film in such a way that they are not removed by damp mopping. There is a correlation between dirt pick-up resistance and the surface energy of the film; the dirt pick-up decreasing as the surface energy of the polish film decreases. Heel marking can be considered a special case of dirt pick-up wherein material from the shoe heel is transferred to the polished tile in black streaks as a consequence of adhesive wear. Once the heel mark is embedded in the polish film, its retention depends, inter alia, on the surface energy of the film.

There has been a continuing effort to improve both the general appearance and performance characteristics of polish films by modification of floor polish compositions. A significant portion of this effort has been directed to the discovery of fluorochemicals which are more effective than the fluorochemicals presently used, e.g., $C_7F_{15}SO_2N(CH_3)_2CH_2CO_2K$, and are more economical to use.

SUMMARY OF THE INVENTION

An object of the present invention is to provide fluorochemicals which have greater effectiveness than the fluorochemicals presently used in floor polish composition.

Another object of the present invention is to improve both the general appearance and the performance characteristics of floor polishes.

In accordance with the present invention floor polishes are improved by the incorporation of a fluorochemical selected from either an amine salt of fluorinated cyclic hexyl carbinol which has been reacted with phosphorus pentoxide or the amine salt of undecafluorocyclohexane carbinol acrylate-methacrylic acid copolymer. The incorporation of either fluorochemical in a floor polish composition is an amount between about 0.01 and about 0.15 solids based on total solids (and preferably between about 0.02 and about 0.1 solids based on total solids) provides a highly advantageous and unexpected combination of properties, including both good general appearance and improved performance characteristics.

DESCRIPTION OF THE PREFERRED EMBODIMENT

The fluorochemicals which are incorporated into floor polish compositions in accordance with the present invention are either (1) an amine salt of a fluorinated cyclic hexyl carbinol which has been reacted with phosphorus pentoxide or (2) the amine salt of undecafluorocyclohexane carbinol acrylatemethacrylic acid copolymer.

The method of preparing the first fluorochemical, which can be used in accordance with the present invention, is disclosed in Ser. No. 39,175, filed May 20, 1970; which application is incorporated by reference herein. This method involves reducing the material obtained by the electrofluorination of benzoyl fluoride to a cyclic carbinol material which is subsequently reacted with $P_2O_5$ and adjusted to a pH of about 5 with diethanol amine. The diethanol amine salt of polyfluorocyclohexyl alkyl phosphate is prepared in this manner.

The method of preparing the second fluorochemical, which can be used in accordance with the present invention, is disclosed in Ser. No. 875,590, filed Nov. 10, 1969; which application is incorporated by reference herein. The copolymer is prepared by either solution or emulsion copolymerization and contains a ratio of the fluorocarbon acrylic monomer to the methacrylic acid in the range of from about 99:1 to about 50:50; preferably from about 9:5 to about 75:25. Particularly preferred is the ratio of 85:15.

The amine salts which can be used include ethyl amine, triethanolamine, ammonium hydroxide, triethylenediamine, diisobutylamine, diethanol amine, ethyl imidazole, imidazole and morpholine.

The floor polish compositions in which the fluorochemicals of the present invention are incorporated are not critical. The fluorochemicals of this invention can be used with any polish whether it be the conventional alkali sensitive, or acid sensitive or the new detergent-resistant, ammonia-sensitive floor polish formulation which results in a surface which is removable using a cleaning solution containing ammonia. Typically, such floor polish formulations contain: (a) an acrylic copolymer, (b) a wax, (c) a leveling agent, (d) a plasticizer, and (e) a coalescent.

Among the waxes which can be used are those which are dispersible in alkaline aqueous solution, e.g., carnauba or a synthetic wax such as alkali dispersible polyethylenes of low molecular weight (around 2,000) oxidized to alkali dispersibility in water, as for instance in the material sold under the trade names A-C Polyethylene 629 and Epolene E. Such oxidized material is dispersible, for example, in water, containing ammonia at a pH above 7, as at 8–9. Other waxes that we may use are candelilla, oxidized microcrystalline and preferably mixtures of them with carnauba, as in about equal proportions.

Among the film leveling resins which can be used are those which are soluble in water or dispersible therein in presence of alkali and which cause the film of the dried polish to lie flat after evaporation of the aqueous dispersion thereof. Examples that illustrate the class are shellac; alkali soluble maleic anhydride copolymers with styrene or vinyl ethers such as methyl or ethyl vinyl ether; the products of hydrolysis of the said maleic anhydride copolymers; the $C_1$–$C_4$ alkyl half esters of the said products of hydrolysis; terpene maleic anhydride condensation products; rosin adducts of polyesters, of which esters glycol and glycerin succinates, adipates and maleates are examples; and alkali soluble phenol and formaldehyde condensation products.

Among the plasticizers which can be employed are carbitol, tri(butoxyethyl) phosphate and the like.

Among the coalescing agents which can be employed are polar organic compounds which are soluble in water, including dimethyl sulfoxide, dimethyl formamide, dimethyl acetamide, hexamethylphosphoramide, 2-pyrrolidone and N-methyl-2-pyrrolidone.

While the exact proportions of the several components to be used are selected in accordance with the specific properties to be emphasized in the floor polish, generally the acrylic copolymer is present in an amount greater than 60 parts per weight at 15% solids, the wax is present in an amount between 2 and 75 parts by weight, the leveling agent is present in an amount less than about 15 parts by weight, the plasticizer is present in an amount up to about 10 parts by weight and the coalescent is present in an amount up to about 10 parts by weight.

It will be understood that other ingredients normally found in floor polish formulations of the type herein described can also be incorporated therein.

Examples of typical formulations include:

| | Parts by weight |
|---|---|
| A zinc-cross linked modified acrylic copolymer of the type described in French Pat. No. 1,384,695 which has the following physical properties: | |
| Appearance: Milky liquid | |
| Solids: 38% ± 0.5% | |
| Weight per gallon: 8.7 lbs. | |
| pH: 8.5 ± 0.5 | |
| Ionic charge: Anionic | 80.0 |
| (Diluted to 15% solids) | |
| Styrene-maleic anhydride copolymer (15% solids in ammonia) | 5.0 |
| Polyethylene wax (15% solids in morpholine oleate) | 15.0 |
| Carbitol (plasticizer) | 1.5 |
| Ethylene glycol | 1.5 |
| Tri(butoxyethyl) phosphate (plasticizer) | 0.5 |
| Fluorochemical | 0.4 |

The above components are normally added in the order they are listed, although this order of addition is not critical. The carbitol, ethylene glycol, tri(butoxyethyl) phosphate and fluorochemical can be mixed with an equal amount of water and then added slowly to the other ingredients with good stirring. Formaldehyde can also be added in an amount equal to about 500 ppm, as a preservative.

Other typical formulations which can be employed included the following:

| | Parts by Weight |
|---|---|
| A zinc-crosslinked modified acrylic copolymer which has the following physical properties: | |
| Appearance: Milky liquid | |
| Solids: 38% ± 0.5% | |
| Weight per gallon: 8.7 lbs. | |
| pH: 8.5 ± 0.5 | |
| Ionic charge: Anionic | 85.0 |
| (Diluted to 15% solids) | |
| Polyethylene wax (15% solids in morpholine oleate) | 15.0 |
| Carbitol (plasticizer) | 2.0 |
| Ethylene glycol | 2.0 |
| Tri(butoxyethyl) phosphate (plasticizer) | 0.6 |
| Fluorochemical | 0.5 |
| | |
| A zinc-crosslinked modified acrylic copolymer which has the following physical properties: | |
| Appearance: Milky liquid | |
| Solids: 38% ± 0.5% | |
| Weight per gallon: 8.7 lbs. | |
| pH: 8.5 ± 0.5 | |
| Ionic charge: Anionic | 80.0 |
| (Diluted to 15% solids) | |
| Styrene-maleic anhydride copolymer (15% solids in ammonia) | 5.0 |
| Polyethylene wax (15% solids in morpholine oleate) | 15.0 |
| Carbitol (plasticizer) | 1.5 |
| Ethylene glycol | 1.5 |
| Tri(butoxyethyl) phosphate (plasticizer) | 0.4 |
| Fluorochemical | 0.4 |
| | |
| A zinc-crosslinked modified acrylic copolymer which has the following physical properties: | |
| Appearance: Milky liquid | |
| Solids: 38% ± 0.5% | |
| Weight per gallon: 8.7 lbs. | |
| pH: 8.5 ± 0.5 | |
| Ionic charge: Anionic | 65.0 |
| (Diluted to 15% solids) | |
| Styrene-maleic anhydride copolymer | 5.0 |
| Wax emulsion (15% solids) | 30.0 |
| Carbitol (plasticizer) | 1.5 |
| Ethylene glycol | 1.5 |
| Tri(butoxyethyl) phosphate (plasticizer) | 0.35 |
| Fluorochemical | 0.4 |

The invention will be illustrated by the following specific examples, it being understood that there is no intention to be necessarily limited by any details thereof since variations can be made within the scope of the invention.

EXAMPLE I

The floor polish formulations for samples 1 through 4 were prepared using the following general formulation:

| Item | | Parts by Weight |
|---|---|---|
| A | Rhoplex B-336, a zinc-crosslinked modified-acrylic copolymer having the following physical properties: | |
| | Appearance: Milky liquid | |
| | Solids: 38% ± 0.5% | |
| | Weight per gallon: 8.7 lbs. | |
| | pH: 8.5 ± 0.5 | |
| | Ionic charge: Anionic | 80.0 |
| | (Diluted to 15% solids) | |
| B | Polyethylene Latex (15% solids in morpholine oleate) | 15.0 |
| C | Styrene-maleic anhydride copolymer (15% solids in ammonia) | 5.0 |
| D | Carbitol (plasticizer) | 3.0 |
| E | 2-Pyrrolidone (coalescent) | 0.5 |
| F | Tri(butoxyethyl)phosphate (plasticizer) | 0.5 |
| G | Formalin (37%) (bacteriostat) | 0.15 |
| H | Fluorochemical A, B, C (1%) or none (control) | (varied as shown below for each sample) |

Items D, E, F and G are mixed with an equal amount of water, stirred vigorously and are then added to items A, B and C. Finally, item H is added to the resulting admixture.

Sample 1. 0.5 parts by weight of a 1% aqueous solution of $C_7F_{15}SO_2N(CH_3)_2CH_2CO_2K$ (Fluorochemical A)
2. 0.5 parts by weight of a 1% aqueous solution of the ethyl amine salt of undecafluorocyclohexane carbinol acrylate-methacrylic acid copolymer (Fluorochemical B).
3. 0.5 parts by weight of a 1% aqueous solution of the amine salt of a fluorinated cyclic carbinol which has been reacted with phosphorus pentoxide (Fluorochemical C).
4. A control containing no fluorochemical.

Using the following floor service test procedure, which is intended to simulate actual service conditions and to allow for a determination of general appearance (including gloss), resistance to soiling, resistance to heel marking and scuffing, and buffability, the compositions identified above were evaluated by visual observation.

The test floor panels consist of alternate 9 inch squares of black and white vinyl asbestos attached to a backing consisting of a sheet of aluminum alloy (0.032 inch thick) measuring approximately 36 inches square. The aluminum sheet is covered with Kraft paper by taping at the edges. The asphalt tile is attached to the Kraft paper by means of double adhesive faced, pressure-sensitive tape. One panel, consisting of 16 nine by nine inch tiles, and measuring 36 square inches for the whole panel, is used for each polish to be tested.

All panels are thoroughly cleaned prior to use with soap and water containing a small quantity of aqua ammonia. The panels are then thoroughly rinsed in clean water and dried before each application of test polish.

Two coats of polish to be tested are applied to the test floor panel in an amount of approximately 1,500 square feet per gallon. This is equivalent to using 25 milliliters of wax for each 36 inch square panel. It is spread over the panel with a folded mohair applicator prepared by cutting a strip of mohair 2 inches wide by 5 inches long.

The mohair is folded over a 5 inch long, one-fourth inch diameter glass rod, with the free ends held together with a 5 inch spring clip. The applicator is saturated with the polish prior to use and a separate applicator is used with each polish to be tested. The polish is spread over the test panels in both directions, using approximately 10 to 12 strokes in each direction, and finished off with an additional 10 to 12 strokes in the first direction. The panels are allowed to dry for 1 hour at room temperature and either buffed with a power-driven brush or not buffed. Following drying and buffing, the panels are installed in the test area.

All test floor panels are maintained by daily sweeping and are damp mopped weekly, using clear, cold water. In addition, panels are machine buffed weekly immediately after damp mopping and drying. The test panels are shifted one position along the length of the floor every day during the test in order to equalize traffic on all panels being used.

The test is continued for a period of 4 weeks. Each week at least three trained observers rate the test panels for the following properties:

1. Gloss and overall appearance — gloss is best evaluated by judging the appearance of the black tile panels, using approximately the same angle for viewing in the case of each test panel.
2. Slip resistance — this is measured by placing one foot on a piece of bond paper, placed in front of the other foot at a distance of about 9 inches, and sliding the sole of the foot forward along the test area at an angle of about 30° to the vertical.
3. Soil resistance — this is distinguished from heel and scuff marks, and is considered to be only the embedded soil which shows up on the white test panels.
4. Rubber heel marking resistance and scuffing — discoloring traffic marks are considered evidence of heel-marking and non-discoloring traffic marks evidence of scuff marks.

The following method describes the procedure used for the determination of rubber heel marking on floor finishes. Sample vinyl asbestos white tiles, 9 inches by 9 inches square, are cleaned by scrubbing with a nylon brush and 2% potassium oleate solution which contains 0.05% aqua ammonia. The tiles are then rinsed with water and dried in air. The tiles are then flooded with the floor polish to be tested and dried for 2 hours in an upright position. Subsequently, the tiles are rotated 180° and once again flooded with the floor polish. After drying in an upright position for 24 hours, the test panels are dried in an environment of 77°F. and 55% relative humidity.

Six rubber cubes (2 inches by 2 inches by 2 inches) are sanded on each face very gently with Number 400A carborundum paper. After dusting the sanded cubes, the cubes are loaded together with the coated test panels in a capsule. The capsule is rotated at 50 rpm for 2.5 minutes and then the capsule rotation is reversed for an additional 2.5 minutes. At the end of the 5 minute period, the tiles are removed from the capsule, brushed lightly and rated subjectively from best to worst.

The results of this testing are shown in the following tables where P stands for poor, F stands for fair, G stands for good, VG stands for very good, and E stands for excellent.

|  | Sample | | | |
| --- | --- | --- | --- | --- |
|  | 1 | 2 | 3 | 4 (control) |
| Black Heel Marking Resistance | G to VG | E | E | G to VG |
| Gloss | | | | |
| Initially | VG | VG | VG | VG |
| After first week of traffic | F to G | G | F to G | F to G |
| After second week of traffic | F to G | F to G | F to G | F to G |
| After third week of traffic | F | F | F | F |
| After fourth week of traffic | P to F | F | F | F |
| Leveling | E | E | E | E |
| Yellowing | E | E | E | E |

—Continued

|  | Sample | | | |
|---|---|---|---|---|
|  | 1 | 2 | 3 | 4 (control) |
| Slip Resistance |  |  |  |  |
| Initially | VG | VG | VG | VG |
| After first week of traffic | F to G | F to G | F to G | F to G |
| After second week of traffic | P to F | F | F | F |
| After third week of traffic | F | F | F | F |
| After fourth week of traffic | G | F to G | G to VG | F |
| Soil Resistance |  |  |  |  |
| After first week of traffic | VG | VG | G to VG | VG |
| After second week of traffic | G | G | G | G |
| After third week of traffic | G | G to VG | G to VG | G to VG |
| After fourth week of traffic | P to F | F | F | F |
| Rubber Heel Mark Resistance |  |  |  |  |
| After first week of traffic | VG | G to VG | VG to E | VG |
| After second week of traffic | G to VG | G | G | G |
| After third week of traffic | G to VG | G to VG | G to VG | G |
| After fourth week of traffic | F | G to VG | G | G |

EXAMPLE II

Employing the general floor polish formulation set forth in Example I, fluorochemicals A, B and C were incorporated therein in the amounts specified below. The resulting floor polish formulations were evaluated for flow and leveling by the following procedure: 1.3 milliliters of the floor polish was placed on a 6 inch by 6 inch black vinyl tile and spread uniformly over the panel with a 1.5 inch by 1.5 inch cheesecloth pad. "X" was then drawn diagonally from corner to corner across the wet tile before the polish was allowed to dry. The dried polish was then examined visually and rated for flow and leveling by evaluating how much of the X was visible and the extent of disappearance of the X.

| Fluorochemical Parts | A | B | C |
|---|---|---|---|
| 0.4 | 4 | 2 | 3 |
| 0.3 | 3 | 1 | 2 |
| Rating system | | | |
| 1 = X not visible | | | |
| 2 = X slightly visible but level | | | |
| 3 = X definitely visible but level | | | |
| 4 = X definitely visible with slight ridges | | | |
| 5 = X definitely visible with definite ridges | | | |

These results show that the fluorochemicals of the present invention produce excellent flow and leveling characteristics at low levels and are superior to the fluorochemical which has become the standard in the industry.

From the foregoing, it will be seen that this invention is well adapted to obtain all of the ends and objects hereinabove set forth, together with other advantages which are obvious and which are inherent in the system.

The present invention provides improved floor polishes for both the domestic and industrial user. Tough and hard films are obtained by addition of fluorocarbons in accordance with the present invention and these films have excellent wear properties, a high degree of resistance to dirt pickup and black heel marking, good slip resistance, good gloss and good aging properties. Moreover, floor polishes made in accordance with the present invention are recoatable and may be applied almost immediately over a previous base of the same floor polish.

The fluorochemicals of the present invention do not cause the foaming problems associated with the very active fluorochemicals which have heretofore been used, but the fluorochemicals of the present invention are sufficiently active to act as flow and leveling agents.

Obviously, many modifications and variations of the invention as hereinbefore set forth may be made without departing from the spirit and scope thereof. Therefore, only such limitations should be imposed as are indicated by the appended claims.

What is claimed is:

1. A floor polish composition comprising a crosslinkable modified acrylic copolymer, a wax, a leveling agent, a plasticizer, a coalescent and a fluorochemical, wherein the fluorochemical is selected from the group consisting of an amine salt of a fluorinated cyclic hexyl carbinol reacted with phosphorus pentoxide and an amine salt of undecafluorocyclohexane carbinol acrylate-methacrylic acid copolymer.

2. The floor polish composition of claim 1 wherein the fluorochemical is an amine salt of a fluorinated cyclic hexyl carbinol reacted with phosphorus pentoxide.

3. The floor polish composition of claim 2 wherein the fluorochemical is the diethanol amine salt of fluorinated cyclic hexyl carbinol reacted with phosphorus pentoxide.

4. The floor polish composition of claim 1 wherein the fluorochemical is an amine salt of undecafluorocyclohexane carbinol acrylate-methacrylic acid copolymer.

5. The floor polish composition of claim 4 wherein the fluorochemical is the ethyl amine salt of undecafluorocyclohexane carbinol acrylate-methacrylic acid copolymer.

6. The floor polish composition of claim 1 wherein the fluorochemical is present in an amount from about 0.01% to about 0.15% solids based on total solids.

7. The floor polish composition of claim 6 wherein the fluorochemical is present in an amount from about 0.02% to about 0.1% solids based on total solids.

8. A floor polish composition comprising from about 0.01% to about 0.15% solids based on total solids of a fluorochemical and a polish selected from the group consisting essentially of alkali sensitive, acid sensitive and detergent resistant, ammonia sensitive types, said fluorochemical selected from the group consisting essentially of an amine salt of a fluorinated cyclic hexyl carbinol reacted with phosphorous pentoxide and an amine salt of undecafluorocyclohexane carbinol acrylate-methacrylic acid polymer.

9. The floor polish composition of claim 8 wherein the fluorochemical is an amine salt of a fluorinated cyclic hexyl carbinol reacted with phosphorus pentoxide.

10. The floor polish composition of claim 9 wherein the fluorochemical is the diethanol amine salt of fluorinated cyclic hexyl carbinol reacted with phosphorus pentoxide.

11. The floor polish composition of claim 8 wherein the fluorochemical is an amine salt of undecafluorocyclohexane carbinol acrylate-methacrylic acid copolymer.

12. The floor polish composition of claim 11 wherein the fluorochemical is the ethyl amine salt of undecafluorocyclohexane carbinol acrylate-methacrylic acid copolymer.

* * * * *